United States Patent Office 2,826,528
Patented Mar. 11, 1958

2,826,528

HALIDE POLYALKYLACRYLIC COMPOSITIONS

Morris V. Shelanski, Atlantic City, N. J., and Murray W. Winicov, Philadelphia, Pa., assignors to West Laboratories, Inc., Long Island City, N. Y., a corporation of New York No Drawing. Application May 20, 1957
Serial No. 660,073

14 Claims. (Cl. 167—17)

The present invention relates to preparations for controlling microorganisms, particularly bacteria, fungi, molds, etc. This application is a continuation-in-part of our pending application Serial No. 287,264, filed May 10, 1952, now abandoned.

Iodine is recognized as an excellent bactericide. However, it cannot be efficiently used in its free form because of its high vapor pressure resulting in excessive loss of the free iodine when applied to control microorganisms. In view of its poor solubility in water (only 0.0162 part of iodine dissolves in 100 parts of water at 0° C. and 0.09566 part of iodine dissolves in 100 parts of water at 60° C.), it cannot be used in the form of an aqueous solution. A solution of iodine in the common water miscible solvents for iodine such as acetone, ethyl alcohol, methyl alcohol, glycols and glycerols, cannot be used effectively to control microorganisms in water because upon addition of such solution to water much of the iodine is precipitated promptly and is lost without exercising its germicidal action. The addition of an iodine solution in a water immiscible solvent such as carbon tetrachloride, benzene and ether to water containing microorganisms does not result in control of the microorganisms because little of the iodine dissolves in the water, the amount thus dissolved being limited by the solubility of iodine in water which as above noted is very small.

We have found that iodine, iodine chloride and iodine bromide combine with certain polyalkylacrylic acids and certain derivatives thereof to produce iodine solutions or complexes which are soluble in water to produce iodine containing solutions in which the iodine is released gradually. In the case of the iodine chloride and iodine bromide complexes or solutions the iodine is released in the form of iodine chloride and iodine bromide which immediately decompose to produce free iodine. The resulting preparation is therefore most effective to control microorganisms.

The iodine solution or complex may be dissolved in water to produce an iodine containing solution having a concentration as high as 30% by weight of iodine. Solutions of any desired iodine concentration may thus be produced, for example, within the range of from 0.1% to 30% by weight of iodine. This is indeed surprising, because organic carboxylic acids do not form such iodine solutions or complexes. Acrylic acid not only does not form such iodine solutions or complexes but it reacts with iodine to combine with a prohibitive amount which becomes totally ineffective to exercise any germicidal action. We have discovered, however, that the polyalkylacrylic acids and derivatives thereof identified below have the property of forming iodine solutions or complexes which are soluble in aqueous media, i. e., solubilize iodine, iodine chloride and iodine bromide in aqueous media.

The polyalkylacrylic acids and derivatives thereof employed have the following formula:

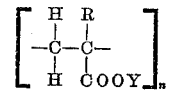

in which n is an integer from 10 to 500, preferably 20 to 100, R is an alkyl group containing from 1 to 10 carbon atoms, Y is (1) hydrogen, (2) an alkyl group containing from 1 to 20, preferably 2 to 12, carbon atoms, (3) substituted 1 to 3 carbon alkyl radicals having a terminal substituent selected from the group consisting of carboxylic acid, carboxylic salt, sulphonic acid, and sulphonic salt radicals, morpholino, amino, mono- and di-lower alkyl amino radicals and acid salts thereof, and quaternary ammonium radicals, (4) an alkylene oxide chain, preferably ethylene oxide or propylene oxide, and containing from 2 to 40, preferably 2 to 20, mols of alkylene oxide per mol of polyalkylacrylic acid, (5) mixed ethylene oxide propylene oxide polymers containing from 1 to 20 mols of ethylene oxide and 1 to 20 mols of propylene oxide per mol of polyalkylacrylic acid, (6) glyceryl, or (7) glycerol derivatives having the formula:

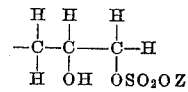

in which Z is sodium, potassium or hydrogen; and in which the group —OY may be an amine group having the formula NR'R" in which the substituents R' and R" are selected from the group consisting of hydrogen and alkyl radicals containing from 1 to 10, preferably 1 to 6, carbon atoms, and one of the substituents R' and R" can be a substituted 1 to 3 carbon alkyl radical having a terminal substituent selected from the group consisting of carboxylic acid, carboxylic salt, sulphonic acid and sulphonic salt radicals, 2 to 3 carbon alkylene oxide chains containing 2 to 40, preferably 2 to 20, alkylene oxide groups, morpholino, amino, mono- and di-lower alkyl amino radicals and acid salts thereof, and quaternary ammonium radicals; as well as polyalkylacrylic acid derivatives containing mixtures of said substituents for the groups —Y and —OY. These compounds are herein referred to as polyalkylacrylic compounds.

Examples of such compounds are:

(a) Polyalkylacrylic acids, e. g., polymethacrylic acid, polyethacrylic acid, etc. having the formula:

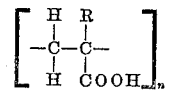

in which R and n have the values above noted.

(b) Derivatives of polyalkylacrylic acids in which the carboxyl group is esterified with (1) an alcohol R'''OH in which R''' is any straight or branched chain alkyl group containing from 1 to 20, preferably 1 to 10, carbon atoms, e. g., the ethyl ester of polymethacrylic acid in which from 10% to 100%, preferably about 50%, of the carboxyl groups are esterified, (2) a substituted 1 to 3 carbon alcohol having a terminal substituent selected from the water solubilizing group consisting of carboxylic acid, carboxylic salt, sulphonic acid, and sulphonic salt radicals, morpholino, amino, mono- and di-lower alkyl amino radicals and acid salts thereof, and quaternary ammonium radicals including quaternary ammonium radicals having one 12 to 18 carbon substituent, or (3) polyalkylene oxide chain.

(c) Glycerol esters of polyalkylacrylic acids such as the glycerol ester of polymethacrylic acid, polyethacrylic acid, etc. These esters have the formula:

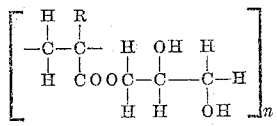

in which R and $n$ have the values above given.

(d) γ Sodium or potassium sulfate ester of the glycerol ester of polyalkylacrylic acids and sulfuric acid esters of the glycerol ester of polyalkylacrylic acids. These sulfate and sulfuric acid esters have the formula:

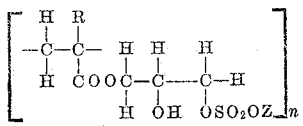

in which R, Z and $n$ have the values above given.

The glycerol substituent in the above formula may be partially esterified by an aliphatic fatty acid (R'''COOH in which R''' is an alkyl radical containing from 1 to 10 carbon atoms, preferably 1 to 5 carbon atoms).

(e) Amine derivatives of polyalkylacrylic acids having the formula:

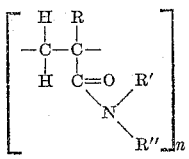

in which R, R', R'' and $n$ have the values above given.

The polyalkylacrylic compound may be mixed with iodine at room temperature or any temperature at which the constituents and resultant mixture are stable, i. e., do not decompose. From 0.1% to 5% iodine, preferably from 1% to 3%, by weight based on the weight of the polyalkylacrylic compound are mixed together. The resulting mixture is either liquid or solid depending upon the polyalkylacrylic compound employed. When it is desired to use this preparation, it is added to an aqueous medium, e. g., water, forming a solution of any desired iodine concentration. When this solution is applied to control microorganisms it releases the iodine gradually so that it is effective to react with and destroy the microorganisms.

With respect to polyalkylacrylic compounds in which the substituent Y, or one of the substituents R' or R'' in the group

replacing the group —OY, is a substituted 1 to 3 carbon alkyl radical as above defined the selection of substituent in said alkyl radical can influence properties of the compound such as increasing its water solubility, reducing the loss of complexed iodine due to vapor pressure, or enhancing the substantivity of the compound to various fabrics and fibers. Thus variation in the substituent of said alkyl radical as well as other variations in the substituents —Y and —OY can facilitate the adaptation of the polyalkylacrylic compounds and iodine carriers to particular uses and applications.

Iodine monochloride and iodine monobromide are preferred of the iodine halides. However, as much chlorine may be combined with the iodine in the presence of the polyalkylacrylic compound as corresponds with the formation of iodine pentachloride or any desired lower ratio of chlorine to iodine than the 5 to 1 ratio in iodine pentachloride. Similarly, as much bromine may be combined with the iodine to form iodine tribromide or any other desired ratio of iodine to bromine.

The preparation may contain from 0.1% to 5% iodine, preferably from 1% to 3%, by weight of iodine based on the weight of the polyalkylacrylic compound and from 0.1% to 2%, preferably from 1% to 2% chlorine, in the case of the chloride and a like amount of bromine, in the case of the bromide, based on the weight of the polyalkylacrylic compound.

Preparations embodying this invention may be prepared by reacting chlorine or bromine in the gaseous phase directly with iodine in the presence of the polyalkylacrylic compound while cooling the reaction mixture. The introduction of chlorine or bromine gas is stopped when the desired predetermined weight of chlorine or bromine, respectively, has been added. Alternatively, preformed iodine monochloride, iodine trichloride or the corresponding bromides may be added directly to the polyalkylacrylic compound.

In general, the iodine or iodine halide and polyalkylacrylic compound are mixed at atmospheric temperatures, although any temperature at which the constituents are stable may be employed. When forming the iodine chloride or iodine bromide in situ in the polyaykylacrylic compound, the latter, if not liquid, is liquefied by heating to any desired temperature at which it does not decompose and is in the liquid phase, free iodine added as solid crystals and dissolved therein and chlorine or bromine gas then bubbled through the resulting solution.

The following examples illustrate preparations embodying this invention. It will be understood the invention is not limited to these examples. In these examples all parts are by weight.

*Example I*

12.8 parts of iodine monochloride
77.2 parts of polymethacrylic acid having a molecular weight of about 4500

*Example II*

1.5 parts of iodine trichloride
98.5 parts of polyethacrylic acid having a molecular weight of about 7500

*Example III*

16 parts of iodine bromide
84 parts of polymethacrylic acid having a molecular weight of about 4300 esterfied with about 20 mols of ethylene oxide per mol of polymethacrylic acid

*Example IV*

5 parts of iodine
95 parts of ethyl ester of polymethacrylic acid having a molecular weight of about 4300

*Example V*

7 parts of iodine
93 parts of sodium sulfate ester of the glycerol ester of polymethacrylic acid having a molecular weight of about 4300

*Example VI*

One part by weight of iodine is complexed with 99 parts by weight of polymerized 2-diethylaminoethyl methacrylate having a molecular weight of about 10,000, and converted to the acid salt with phosphoric acid.

*Example VII*

Five parts by weight of iodine is complexed with 95 parts by weight of polymerized 2-diethylaminoethyl methacrylate, quaternized with ethyl bromide and having a molecular weight of about 12–15,000.

*Example VIII*

Two parts by weight of iodine is complexed with 98 parts by weight of polymerized methyl sulphonic acid derivative of methacrylic acid (wherein the substituent —Y is —CH$_2$SO$_3$H) having a molecular weight of about 10,000.

Example IX

Five parts by weight of iodine is complexed with 95 parts by weight of polymerized methyl carboxylic acid derivative of methacrylic acid (wherein the substituent —Y is —CH₂COOH, and made by esterifying polymethacrylic acid with hydroxy acetic acid), having a molecular weight of about 8,000.

Example X

Four parts by weight of iodine is complexed with 96 parts by weight of a polymerized morpholino methacrylate derivative (wherein the group —OY is the morpholino group —NC₄H₈O) having a molecular weight of about 10,000, and converted to the acid salt with phosphoric acid.

Example XI

Four parts by weight of iodine is complexed with 96 parts by weight of a polymerized methacrylic acid derivative wherein the group —OY is

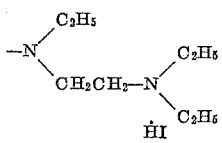

having a molecular weight of about 15,000.

Example XII

Five parts by weight of iodine is complexed with 95 parts by weight of a polymerized methacrylic acid derivative wherein the group —OY is

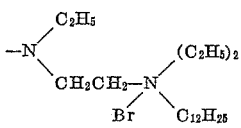

(which is the derivative of Example XI quaternized with lauryl bromide) having a molecular weight of about 16,000–20,000.

Example XIII

One hundred and eighty parts (by weight) of water, 0.1 part of ammonium sulfate, .0015 part of ferrous sulfate, 19 parts of methacrylic acid, 1 part of methyl methacrylate, and 0.1 part of sodium metabisulfite are combined in a glass vessel and heated with agitation to 50° C. for one hour, forming a water soluble polymer with approximately 5% of the available carboxyl groups esterified with the methyl group. One part by weight of iodine is dissolved in 99 parts by weight of this solution forming an iodine complex with the mixed polymer in said solution.

Example XIV

Five parts by weight of iodine is complexed with a mixed methacrylic polymer obtained by copolymerizing 30 parts by weight of 2-diethylaminoethyl methacrylate with 70 parts of methacrylic acid, and quaternizing approximately one-half of the free amino groups by heating with a suitably restricted amount of ethyl bromide. This mixed polymer contains on the one polymer "backbone" substituents corresponding with the substituents of the polymers described in Examples VI and VII as well as free carboxyl groups.

Example XV

A polymethacrylic acid composition having a molecular weight of about 10,000 and wherein 40% of the repeating methacrylic acid units are substituted as in Example XII

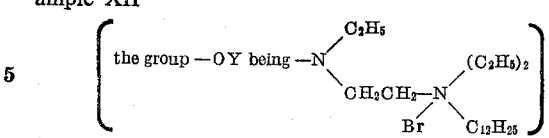

is refluxed with an excess of hydroxyacetic acid and a trace of acid catalyst until the carboxyl groups are esterified. About 5 parts by weight of iodine is then complexed with 95 parts by weight of the modified mixed polymer.

The compositions of the foregoing examples, when added to an aqueous medium produce solutions containing any desired concentration of iodine depending upon the amount of the preparation dissolved or dispersed in the aqueous medium. Such solutions or dispersions when applied to control microorganisms gradually release iodine which is effective to combat the microorganisms.

The compositions of Examples I to III which include iodine chloride or iodine bromide instead of iodine alone, are illustrative of compositions which can be prepared with any of our various polyalkylacrylic carriers. When compositions containing iodine chloride or iodine bromide are added to an aqueous medium to form an aqueous solution or dispersion, and such solution or dispersion is applied to control microorganisms, it gradually releases halogens which decomposes to form free iodine and oxidizing substances, which are effective to combat the microorganisms; the iodides thus formed being regenerated to free iodine by the oxidation effect which inherently is present. The solutions containing iodine chloride or iodine bromide are therefore more effective to control microorganisms than solutions containing iodine alone.

The solutions thus produced may be employed to combat microorganisms domestically and industrially, particularly the latter. For example, such solutions may be applied to paper in the course of its manufacture to control mold and fungi. It may be used for cleaning surfaces to insure sanitary conditions, e. g., for the cleaning of floors, walls, sinks, bowls and other surfaces, as a rinse for dishes and kitchen utensils, as a germicidal composition, a constituent of soaps, etc. Such soaps may contain from 10 to 50 parts by weight of soap stock, e. g., saponified faty acids, from 2 to 20 parts of the polyalkylacrylic compound complexed with 0.1 to 5% of iodine, iodine chloride or bromide. The soaps may contain other constituents such as polyethylene glycol of a molecular weight about 6000 when a solid soap product is desired, pigments or dyestuffs, perfuming agents and fillers.

Various changes and modifications in the compositions herein disclosed will occur to those skilled in the art, and to the extent that such changes and modifications are embraced by the appended claims, it is to be understood that they constitute part of our invention.

We claim:

1. A preparation for the control of microorganisms consisting essentially of a halide from the group consisting of iodine, iodine chloride and iodine bromide and a polyalkylacrylic compound having at least ten units of alkylacrylic acid in the molecule.

2. The preparation defined in claim 1 containing from 0.1% to 5% of the halide by weight based on the weight of the polyalkylacrylic compound.

3. A preparation for the control of microorganisms consisting essentially of a halide from the group consisting of iodine, iodine chloride and iodine bromide and a polyalkylacrylic compound having the formula

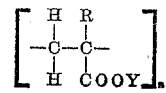

in which n is an integer from 10 to 500, R is an alkyl group containing from 1 to 10 carbon atoms and Y is from the group consisting of hydrogen, an alkyl group containing from 1 to 20 carbon atoms, substituted 1 to 3 carbon alkyl radicals having a terminal substituent selected from the group consisting of carboxylic acid, carboxylic salt, sulphonic acid, and sulphonic salt radicals, morpholino, amino, mono- and di-lower alkyl amino radicals and acid salts thereof, and quaternary ammonium radicals, an alkylene oxide chain containing from 2 to 40 mols of alkylene oxide per mol of alkylacrylic acid, mixed ethylene oxide propylene oxide polymers containing from 1 to 20 mols of ethylene oxide and 1 to 20 mols of propylene oxide per mol of alkylacrylic acid, glyceryl, and glycerol derivatives having the formula

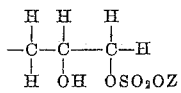

in which Z is from the group consisting of sodium, potassium and hydrogen; and wherein the group OY may be an amine group having the formula NR'R" in which the substituents R' and R" are selected from the group consisting of hydrogen and alkyl radicals containing from 1 to 10 carbon atoms, and one of the substituents R' and R" can be a substituted 1 to 3 carbon alkyl radical having a terminal substituent selected from the group consisting of carboxylic acid, carboxylic salt, sulphonic acid, and sulphonic salt radicals, 2 to 3 carbon alkylene oxide chains containing 2 to 40, preferably 2 to 20, alkylene oxide groups, morpholino, amino, mono- and di-lower alkyl amino radicals and acid salts thereof, and quaternary ammonium radicals; as well as polyalkylacrylic acid derivatives containing mixtures of said substituents for the groups —Y and —OY.

4. The preparation defined in claim 3 containing from 0.1% to 5% of the halide by weight based on the weight of the polyalkylacrylic compound.

5. A preparation from the control of microorganisms consisting essentially of a halide from the group consisting of iodine, iodine chloride and iodine bromide and a polyalkylacrylic acid in which the alkyl substituent contains from 1 to 10 carbon atoms and which has a molecular weight from 20 to 100 times the molecular weight of the alkylacrylic acid monomer of which the polymer is constituted.

6. The preparation defined in claim 5 containing from 0.1% to 5% of the halide by weight based on the weight of the polyalkylacrylic compound.

7. A preparation for the control of microorganisms consisting essentially of a halide from the group consisting of iodine, iodine chloride and iodine bromide, an aliphatic alcohol esterified polyalkylacrylic acid in which the alkyl substituent contains from 1 to 10 carbon atoms, the polyalkylacrylic acid has a molecular weight from 20 to 100 times the alkylacrylic monomer of which the polymer is constituted and the aliphatic alcohol with which the polyalkylacrylic acid has been esterified contains from 1 to 20 carbon atoms.

8. The preparation defined in claim 7 containing from 0.1% to 5% of the halide by weight based on the weight of the polyalkylacrylic compound.

9. A preparation for the control of microorganisms consisting essentially of a halide from the group consisting of iodine, iodine chloride and iodine bromide, a polyalkylene oxide condensate of polyalkylacrylic acid in which the alkyl substituent contains from 1 to 10 carbon atoms, the polyalkylacrylic acid has a molecular weight from 20 to 100 times the molecular weight of the alkylacrylic acid monomer of which the polymer is constituted and from 2 to 40 mols of alkylene oxide are condensed per mol of polyalkylacrylic acid.

10. The preparation defined in claim 9 containing from 0.1% to 5% of the halide by weight based on the weight of the polyalkylacrylic compound.

11. A preparation for the control of microorganisms consisting essentially of a halide from the group consisting of iodine, iodine chloride and iodine bromide, and a glycerol ester of a polyalkylacrylic acid in which the alkyl substituent contains from 1 to 10 carbon atoms and which has a molecular weight from 20 to 100 times the molecular weight of the alkylacrylic acid monomer of which the polymer is constituted.

12. The preparation defined in claim 11 containing from 0.1% to 5% of the halide by weight based on the weight of the polyalkylacrylic compound.

13. A preparation for the control of microorganisms consisting essentially of a halide from the group consisting of iodine, iodine chloride and iodine bromide, and an alkali metal sulfate ester of the glycerol ester of polyalkylacrylic acid in which the alkyl substituent contains from 1 to 10 carbon atoms and which has a molecular weight from 20 to 100 times the molecular weight of the alkylacrylic acid monomer of which the polymer is constituted.

14. The preparation defined in claim 13 containing from 0.1% to 5% of the halide by weight based on the weight of the polyalkylacrylic compound.

References Cited in the file of this patent

UNITED STATES PATENTS

| | | |
|---|---|---|
| 2,077,298 | Zelger | Apr. 13, 1937 |
| 2,237,567 | Land | Apr. 8, 1941 |
| 2,533,166 | Jones | Dec. 5, 1950 |
| 2,576,839 | Jones | Nov. 27, 1951 |

OTHER REFERENCES

West: J. Chem. Physics, vol. 15, 1947, p. 689.
Chem. and Eng. News, February 19, 1951, p. 664.